United States Patent
Owaki et al.

(10) Patent No.: US 8,607,103 B2
(45) Date of Patent: Dec. 10, 2013

(54) TRANSMISSION/RECEPTION DEVICE, TRANSMISSION DEVICE, RECEPTION DEVICE, AND DATA TRANSMISSION/RECEPTION METHOD

(75) Inventors: Takeshi Owaki, Kawasaki (JP); Takaharu Ishizuka, Kawasaki (JP); Susumu Akiu, Kawasaki (JP); Atsushi Morosawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/224,995

(22) Filed: Sep. 2, 2011

(65) Prior Publication Data
US 2011/0320885 A1 Dec. 29, 2011

Related U.S. Application Data

(63) Continuation of application No. PCT/JP2009/001060, filed on Mar. 10, 2009.

(51) Int. Cl.
*G01R 31/28* (2006.01)

(52) U.S. Cl.
USPC .......................................................... 714/715

(58) Field of Classification Search
USPC .......................................... 714/715, 716, 717
See application file for complete search history.

(56) References Cited

U.S. PATENT DOCUMENTS

| | | | |
|---|---|---|---|
| 5,351,232 A * | 9/1994 | Yamashita | 370/248 |
| 5,553,059 A * | 9/1996 | Emerson et al. | 370/248 |
| 5,726,991 A * | 3/1998 | Chen et al. | 714/704 |
| 6,628,621 B1 * | 9/2003 | Appleton et al. | 370/249 |
| 6,671,835 B1 * | 12/2003 | Hanna et al. | 714/712 |
| 6,684,351 B1 * | 1/2004 | Bendak et al. | 714/715 |
| 6,735,731 B2 * | 5/2004 | Ewen et al. | 714/733 |
| 6,965,648 B1 * | 11/2005 | Smith et al. | 375/257 |
| 7,047,458 B2 * | 5/2006 | Nejedlo et al. | 714/715 |
| 7,216,269 B2 * | 5/2007 | Baba et al. | 714/716 |
| 7,321,997 B2 * | 1/2008 | Zimmerman et al. | 714/718 |

(Continued)

FOREIGN PATENT DOCUMENTS

| | | |
|---|---|---|
| JP | 2-245675 | 10/1990 |
| JP | 5-53857 | 3/1993 |

(Continued)

OTHER PUBLICATIONS

Partial English Translation of Japanese Reference 2006-180213, publication date Jul. 6, 2006.

(Continued)

*Primary Examiner* — James C Kerveros
(74) *Attorney, Agent, or Firm* — Staas & Halsey LLP

(57) ABSTRACT

A transmission/reception device includes a transmission device that divides a plurality of connection lines into a plurality of groups, determines corresponding connection lines in the plurality of groups, determines a correspondence between test pattern and the connection line, and outputs the test pattern to the plurality of connection lines based on the correspondence between the test pattern and the connection line, and a reception device that receives the test pattern from the transmission device, compares bits in a same position of the test pattern received through a corresponding connection line in the plurality of groups based on the correspondence between the test pattern and the connection line, and generates erroneous connection line information indicating an erroneous connection line as a connection line in which an error has occurred in the plurality of connection lines based on a result of the comparison.

10 Claims, 8 Drawing Sheets

(56) References Cited

U.S. PATENT DOCUMENTS

| | | | |
|---|---|---|---|
| 7,366,967 B2 * | 4/2008 | Jeon et al. | 714/724 |
| 7,444,558 B2 * | 10/2008 | Mitbander et al. | 714/716 |
| 7,521,950 B2 * | 4/2009 | Bernstein et al. | 324/750.3 |
| 7,564,798 B2 * | 7/2009 | Haber | 370/252 |
| 7,992,058 B2 * | 8/2011 | Maroni et al. | 714/712 |
| 2004/0078672 A1 | 4/2004 | Masuda et al. | |
| 2005/0262284 A1 | 11/2005 | Cherukuri et al. | |

FOREIGN PATENT DOCUMENTS

| | | |
|---|---|---|
| JP | 9-152995 | 6/1997 |
| JP | 2003-280998 | 10/2003 |
| JP | 2004-205352 | 7/2004 |
| JP | 2005-182485 | 7/2005 |
| JP | 2005-332357 | 12/2005 |
| JP | 2006-180213 | 7/2006 |

OTHER PUBLICATIONS

Partial English Translation of Japanese Reference 2005-182485, publication date Jul. 7, 2005.

International Search Report for PCT/JP2009/001060, mailed Jun. 19, 2009.

Japanese Notice of Rejection Grounds mailed Nov. 27, 2012 issued in corresponding Japanese Patent Application No. 2011-503556.

* cited by examiner

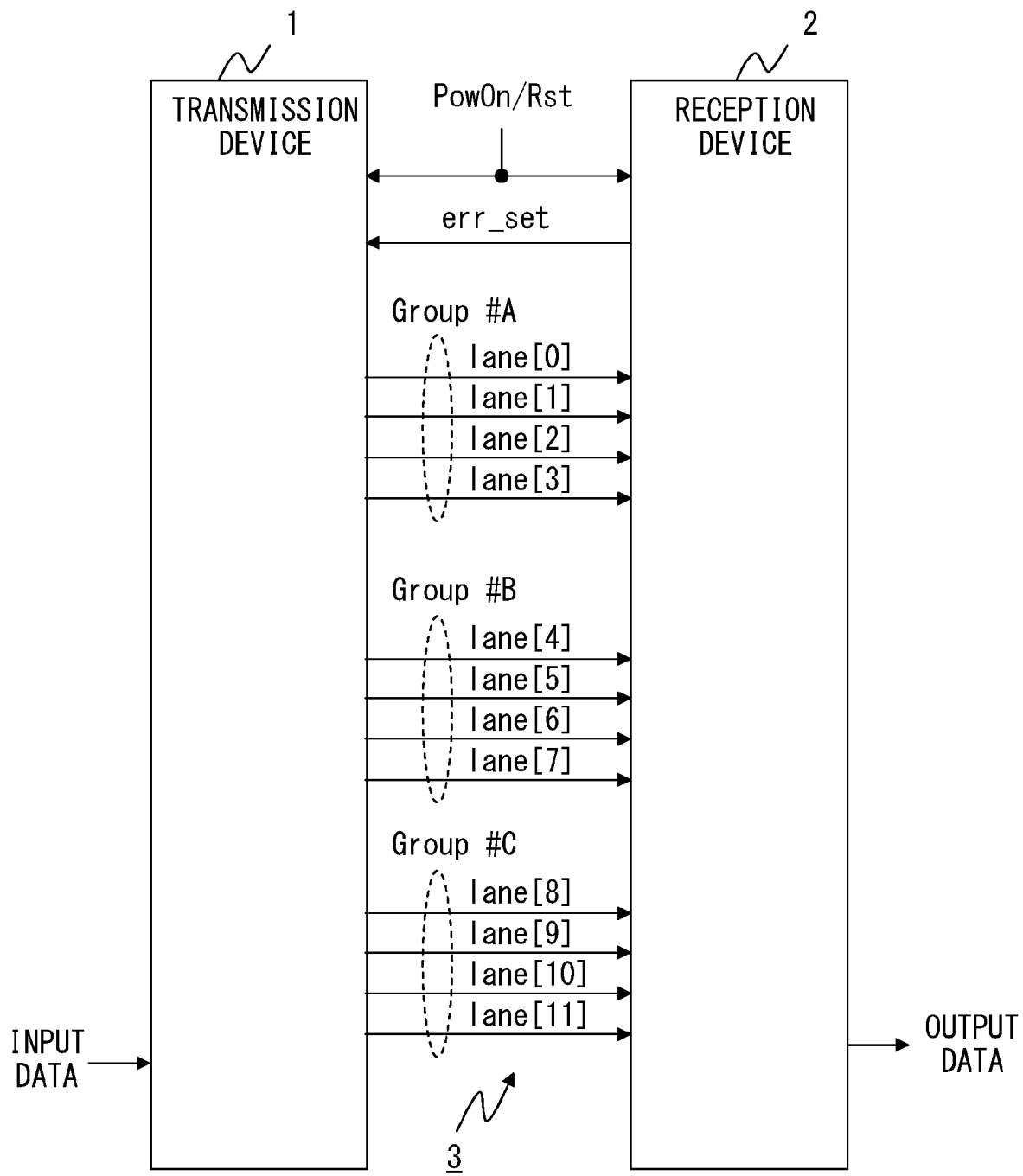
F I G. 1

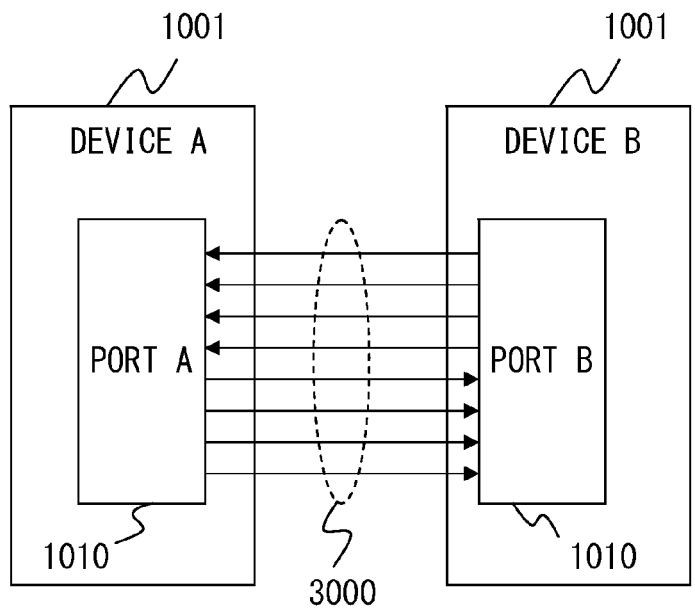
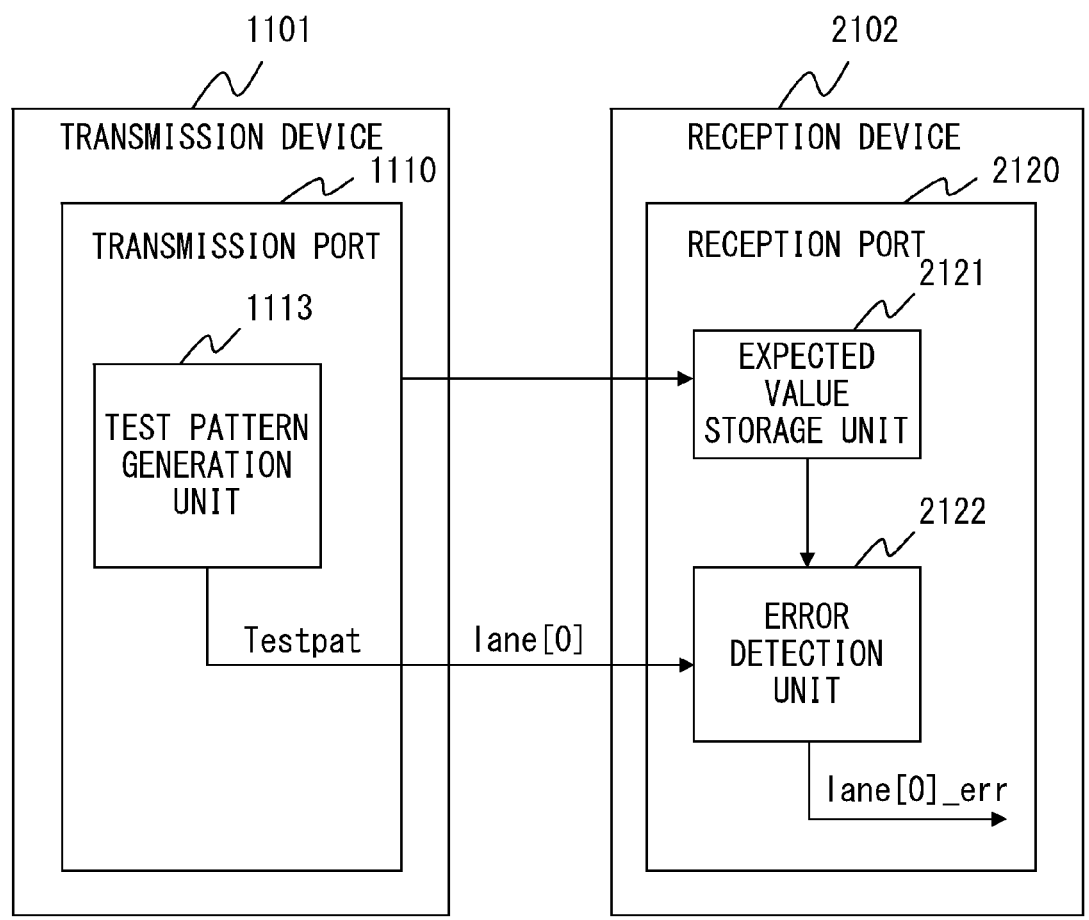
F I G. 7

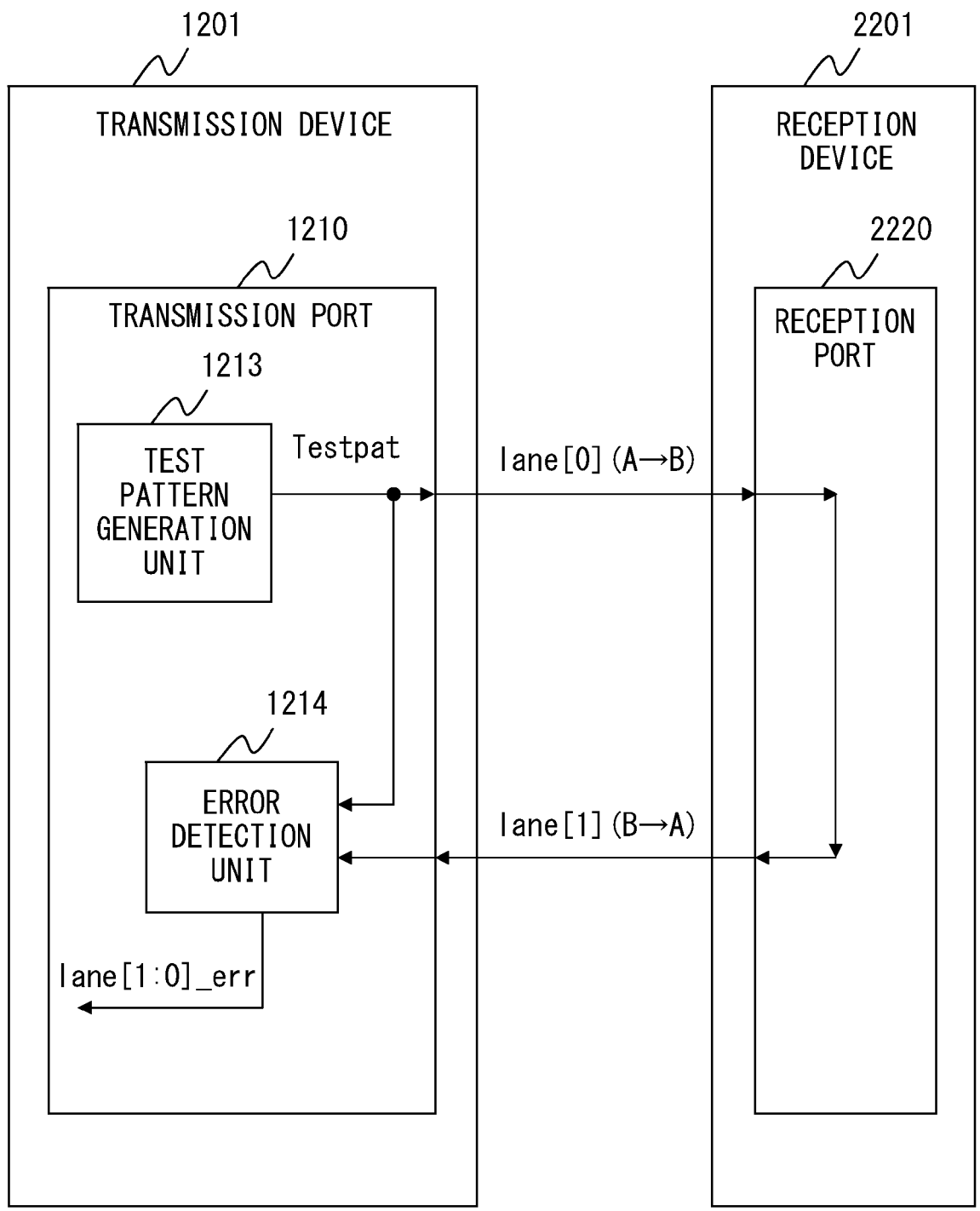
F I G. 8

TRANSMISSION/RECEPTION DEVICE, TRANSMISSION DEVICE, RECEPTION DEVICE, AND DATA TRANSMISSION/RECEPTION METHOD

CROSS-REFERENCE TO RELATED APPLICATIONS

This application is a continuation application of International Application PCT/JP2009/001060 filed on Mar. 10, 2009 and designated the U.S., the entire contents of which are incorporated herein by reference.

FIELD

The embodiments discussed herein are related to a transmission/reception device, a transmission device, a reception device, and a data transmission/reception method.

BACKGROUND

In a transmission/reception device of an information processing system, a transmission system for data transmission between the transmission/reception ports obtained by a plurality of bound serial interfaces connected in a point to point system is adopted. A serial interface connected in a point to point system can typically be, for example, a PCI (Peripheral Component Interconnect)-Express. The connection line between the ports in serial interfaces is generally called a lane.

In a method of a connection test between printed circuit chips, it is proposed to provide a device for assigning a test pattern to an output pin of a chip of a connection line in a printed circuit, acquiring a test value from an input pin of the chip of the connection line, and comparing the value with an expected value.

In an inter-LSI (Large Scale Integrated circuit) connection test circuit, it is proposed to provide a comparison device for comparing test data from a test data storage device with the contents of the test data returned by a signal communication device for returning test data through an external integrated circuit.

Furthermore, in an LSI having a connection test function, it is proposed in a connection test of an LSI chip to provide an input/output selection circuit capable of switching an input signal input from one input terminal to a plurality of output terminals, and input signals from a plurality of input terminals to a plurality of output terminals.

Furthermore proposed in a method of specifying a faulty lane and switching the capacity of the width of two CSI (Common System Interface) agent connected through a link is a method of transmitting and receiving the information about a link width between first and second agents and adjusting a link width.

Patent Document 1: Japanese Laid-open Patent Publication No. 2-245675
Patent Document 2: Japanese Laid-open Patent Publication No. 5-53857
Patent Document 3: Japanese Laid-open Patent Publication No. 2004-205352
Patent Document 4: Japanese Laid-open Patent Publication No. 2005-332357

SUMMARY

According to an aspect of the invention, a transmission/reception device includes a transmission device that divides a plurality of connection lines into a plurality of groups, determines corresponding connection lines in the plurality of groups, determines a correspondence between test pattern and the connection line, and outputs the test pattern to the plurality of connection lines based on the correspondence between the test pattern and the connection line, and a reception device that receives the test pattern from the transmission device, compares bits in a same position of the test pattern received through a corresponding connection line in the plurality of groups based on the correspondence between the test pattern and the connection line, and generates erroneous connection line information indicating an erroneous connection line as a connection line in which an error has occurred in the plurality of connection lines based on a result of the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an example of the configuration of the transmission/reception device;
FIG. 7 is an example of a configuration of the transmission/reception device as a background checked by the inventor;
and
FIG. 8 is an example of a configuration of the transmission/reception device as a background studied by the inventor.

DESCRIPTION OF EMBODIMENTS

Figure 2:
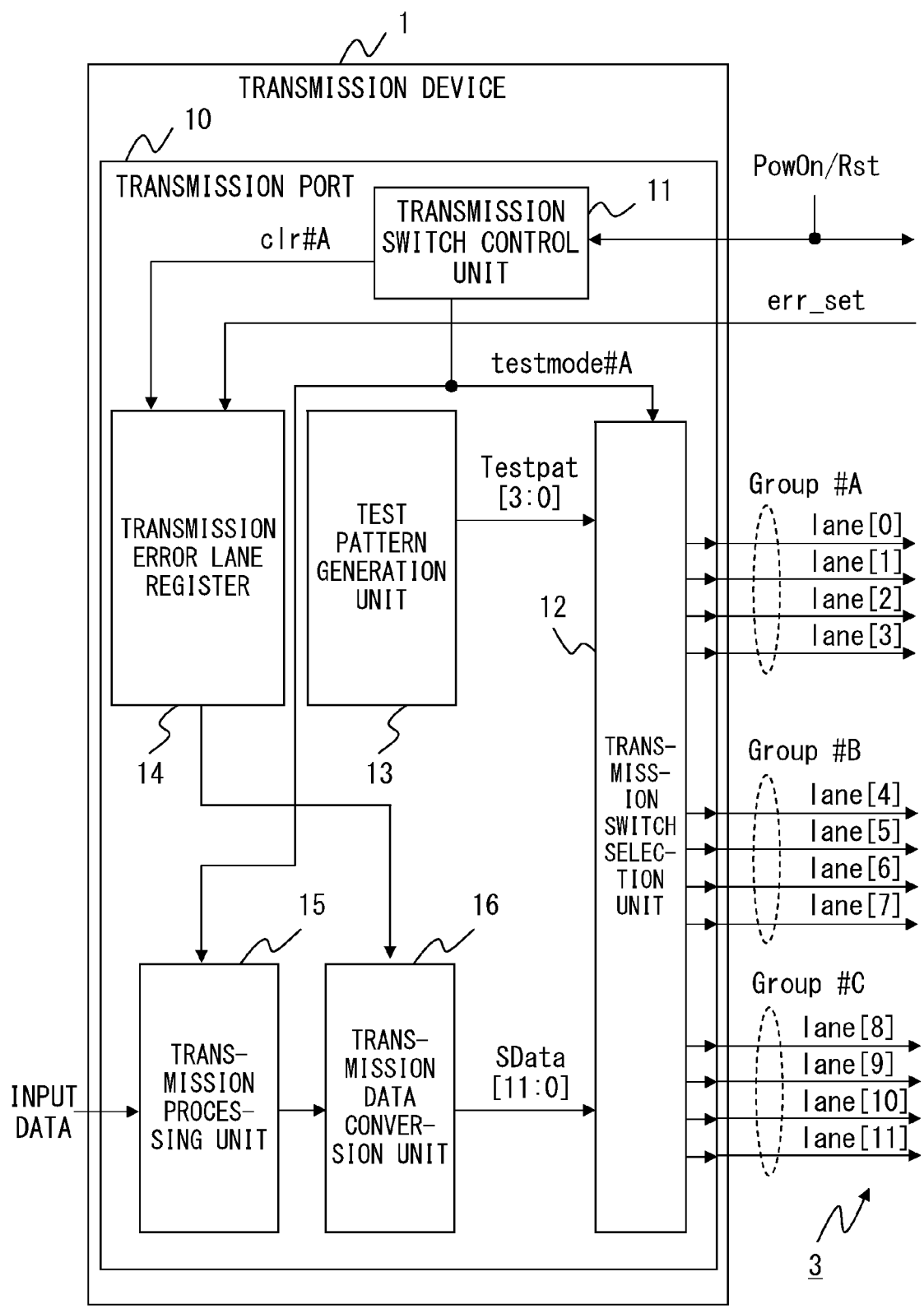
FIG. 2 is an example of the configuration of the transmission/reception device.

FIGS. 7 and 8 are examples of the configuration of the transmission/reception device studied by the inventor.

(A) in FIG. 7 is an explanatory view of a lane as a connection line in the transmission/reception device. The transmission/reception device is provided with a plurality of devices 1001 and a system bus 3000 having a plurality of lanes. The device 1001 is provided with a port 1010 connected to the system bus 3000. The device 1001 represents devices 1001A and 1001B, and the port 1010 represents ports 1010A and 1010B. The port 1010 transmits data through a plurality of lanes of the system bus 3000 connected between the ports 1010A and 1010B.

The inventor has studied the transmission/reception device which performs error diagnostics on the data transmission of the system bus 3000 as illustrated in (B) in FIG. 7 or FIG. 8 in the transmission/reception device illustrated in (A) in FIG. 7.

(B) in FIG. 7 is an explanatory view of detecting an error in data transmission in a lane [0] of a plurality of lanes in the system bus from a transmission device 1101 to a reception device 2101. The transmission device 1101 is provided with a transmission port 1110 having a test pattern generation unit 1113 which generates a test pattern Testpat. The reception device 2101 is provided with an expected value storage unit 2121 for storing an expected value corresponding to the test pattern generated by the test pattern generation unit 1113 and an error detection unit 2122 for referring to the expected value of the expected value storage unit 2121 and detecting an error in the data received through a lane.

In (B) in FIG. 7, the error diagnostics of a reception port 2120 is described by using as an example a lane [0] in the lanes of the system bus 3000.

In the transmission device 1101, the test pattern generation unit 1113 outputs a test pattern Testpat to the reception device 2101. The test pattern Testpat is output through the system bus 3000. Practically, the transmission port 1110 first notifies the reception port 2120 of the type of the expected value of the test pattern in advance. Next, the test pattern generation unit 1113 outputs the data of the test pattern Testpat through the system bus 3000. In the reception device 2101, the expected value storage unit 2121 provided in the reception port 2120 receives the notification of the type of the test pattern Testpat. According to the notification of the type of the test pattern Testpat, the expected value storage unit 2121 notifies the error detection unit 2122 of the expected value of the test pattern Testpat stored in advance.

The error detection unit 2122 inputs the data of the test pattern Testpat received by the reception port 2120 through the system bus 3000. The error detection unit 2122 compares the data of the test pattern Testpat received through the lane [0] with the expected value notified from the expected value storage unit 2121. When the data received through the lane [0] does not match the expected value notified from the expected value storage unit 2121, the error detection unit 2122 outputs an error detection signal (for example, the output "1") to the error information lane[0]_err. Thus, the reception device 2101 can specify the error lane as an erroneous connection line in which an error has occurred in the received data. That is, in the transmission/reception device illustrated in (B) in FIG. 7, it is necessary to have an expected value corresponding to the test pattern Testpat on the reception side to specify the error lane of the system bus 3000.

In FIG. 8, the transmission/reception device performs loopback of data for error diagnostics through the lane [0] and lane [1] between a transmission port 1210 provided in the transmission device 1201 and a reception port 2220 provided in a reception device 2201. Thus, the error detection unit 1214 of the transmission port 1210 can perform the error diagnostics by comparing the looped back data with the data of the test pattern Testpat.

For example, a test pattern generation unit 1213 transmits the data of the test pattern Testpat as data through the lane [0]. The reception port 2220 receives the data through the lane [0], loops back the received data, and transmits the data through the lane [1]. The transmission port 1210 receives the looped back data through the lane [1], and transmits the received data to the error detection unit 1214 with the data of the test pattern Testpat. Based on the data, the error detection unit 1214 performs the error diagnostics. The error detection unit 1214 generates the results of the error diagnostics as error information lane[1:0]_err.

However, in this case, in the transmission/reception device in FIG. 8, the error detection unit 1214 eventually performs the loopback of the transmission side signal and the reception side signal. Therefore, in detecting an error, it cannot be designated in which lane an error portion is located, the transmission side lane [0] or the reception side lane [1].

As described above, to continue the data transmission between the transmission and reception ports, it is necessary for the transmission/reception device in the information processing system to designate a lane in which an error has occurred. Therefore, the transmission/reception device has to perform the error diagnostics for each lane. For example, the transmission/reception device determines in advance a test pattern to be transmitted by the transmission device and has an expected value of the test pattern in the reception device, thereby detecting an error. However, in this case, it is necessary for the reception device to store the expected values of a plurality of test patterns, and it is also necessary to provide a circuit for comparing the test pattern transmitted from the transmission device with the received data. Furthermore, when the reception device cannot normally receive the expected value from the transmission device, the expected value for comparison is not determined, thereby failing to performing the error diagnostics.

On the other hand, it is unnecessary for the transmission/reception device capable of simultaneously performing diagnostics on a plurality of signals among input/output terminals using the loopback to have an expected value corresponding to a test pattern on the reception side, but the device can designate in which lane an error portion is located when it is detected, on the transmission side or the reception side. However, in the method using the loopback, an error portion cannot be designated without performing a plurality of diagnostics by changing the combination of the lanes by switching between the lanes of the loopback paths to be diagnosed. Therefore, in the method using the loopback, a long time is required to perform diagnostics for error detection.

In the diagnostic method using the loopback, the data transmitted from one lane by the transmission device is looped back by the reception device, and transmitted by the reception device through another lane. Therefore, it is not necessary for the reception device to have an expected value depending on the test pattern. However, the loopback data through two lanes does not allow the lane of the data error to be designated between the two lanes. Furthermore, in the diagnostic method using the loopback, the loopback between the input/output terminals of the plurality of lanes is performed in a plurality of combinations, and a loopback test with the combinations is conducted plural times to designate the error portion. However, in this case, a longtime is required to perform the diagnostics in detecting an error.

The transmission/reception device can simplify error diagnostics and shorten the time required to perform the error diagnostics.

Figure 3:
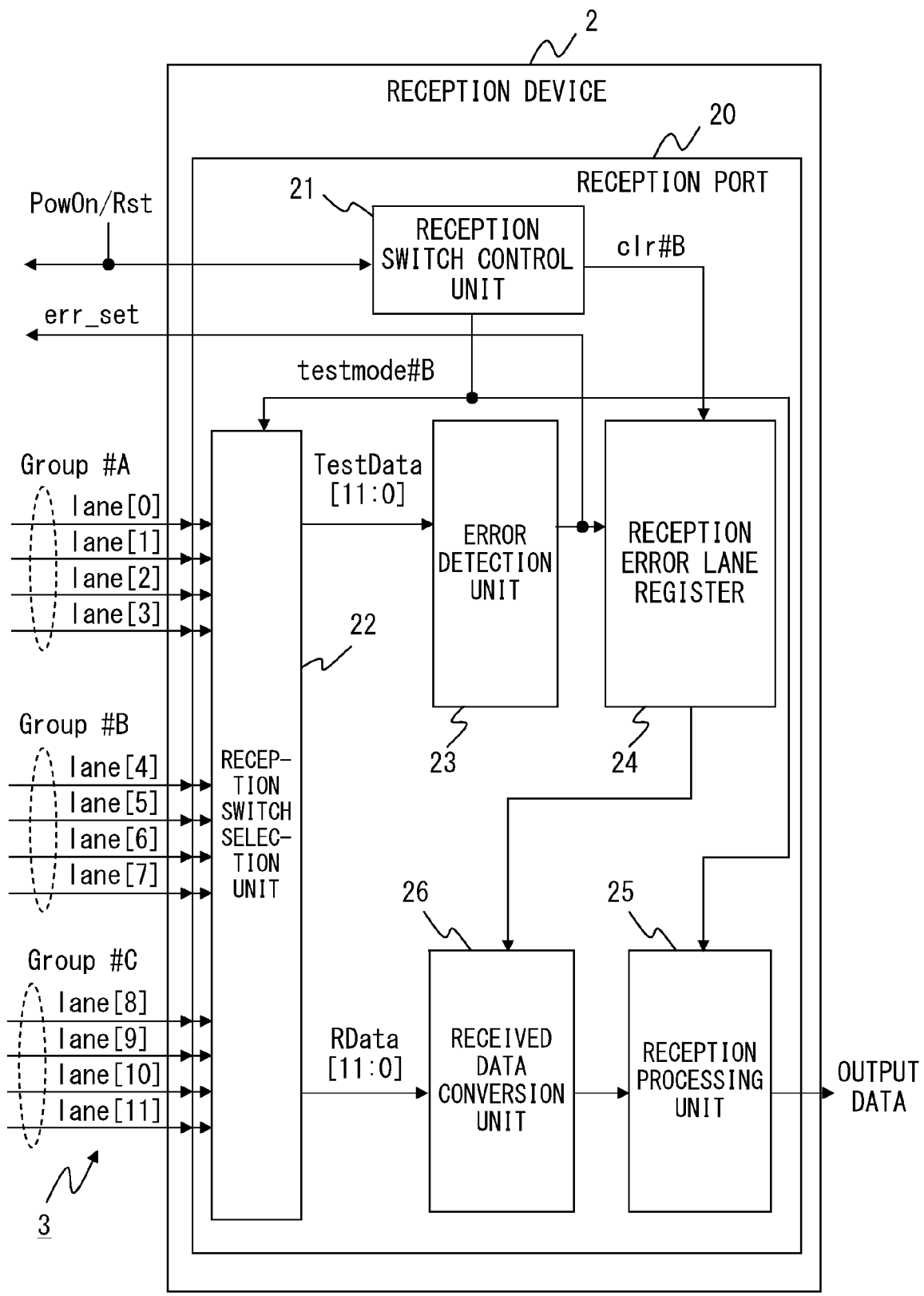
FIG. 3 is an example of a configuration of the transmission/reception device.

FIGS. 1 through 3 are examples of the configurations of the transmission/reception device. Especially, FIG. 1 is a configuration of the entire transmission/reception device, FIG. 2 mainly illustrates a configuration of the transmission device configuring the transmission/reception device, and FIG. 3 mainly illustrates the configuration of the reception device configuring the transmission/reception device. FIGS. 1 through 3 illustrate one transmission/reception device as a unitary construction.

In FIG. 1, the transmission/reception device includes a transmission device 1, a reception device 2, and a system bus 3. The transmission device 1 is, for example, a computer, and transmits data to the reception device 2. The transmission device 1 includes a transmission port 10 for transmitting data. Input data to be transmitted to the reception device is input to the transmission device 1. The reception device 2 is, for example, a computer, and receives data transmitted from the transmission port 10. The reception device 2 includes a reception port 20 for receiving the data transmitted from the transmission port 10. The reception device 2 outputs output data formed based on the received data. The system bus 3 is a communication path for connection between the transmission device 1 and the reception device 2. The data is transmitted through the system bus 3.

The system bus 3 includes a plurality of lanes connected between the transmission port 10 and the reception port 20. In the transmission device 1 in FIG. 1, the system bus 3 includes 12 lanes [0] through [11]. Each lane is, for example, an interface for point-to-point serial connection. The lane is a physical interface such as a wiring formed on a printed circuit, a cable between the printed circuits, etc. Practically, the lane is, for example, a pattern wiring between the printed circuit units as transmission/reception devices of a mother board including a connector in the printed circuit unit inserted into the connector of the mother board as the transmission/reception device corresponding to a PCI mother board.

In this example, in the lane [0], the number in the brackets indicates the position of the lane in the system bus 3. Therefore, for example, the lane [0] indicates the 0-th lane in the system bus 3. There are 12 lanes from the 0-th lane [0] to the 12th lane [11]. That is, the 0-th through the 12th lanes can be expressed by the lane [11:0].

The transmission port 10 transmits data to the reception port 20 through the system bus 3. Therefore, the transmission port 10 includes, as illustrated in FIG. 2, a transmission switch control unit 11, a transmission switch selection unit 12, a test pattern generation unit 13, a transmission error lane register 14, a transmission processing unit 15, and a transmission data conversion unit 16.

The data transmitted to the reception port 20 is one of the transmission data to be originally transmitted and the test pattern. The transmission data is formed by the transmission processing unit 15, and converted by the transmission data conversion unit 16. The test pattern is formed by the test pattern generation unit 13.

The test pattern generation unit 13 generates a test pattern Testpat to be transmitted to the reception device 2. As a test pattern, for example, a plurality of bits, for example, four-bit test pattern Testpat [3:0] is generated. The number of bits of the test pattern is not limited to this example. The 4-bit test pattern Testpat [3:0] is continuously and repeatedly used so that the data can have a necessary bit width.

For example, in Testpat[3:0], the first number in the brackets indicates the highest order bit of the test pattern, and the last number in the brackets indicates the lowest order bit in the test pattern. Therefore, Testpat[3:0] indicates the test pattern including the four bits from the 0-th bit to the third bit.

In addition, for example, in Testpat[0], the number in the brackets indicates the position of the bit in the test pattern or its value. Therefore, for example, Testpat [0] indicates the 0-th bit in the test pattern or its value.

The description above holds true with the test data TestData [3:0] and the test data TestData [0] described later.

The test pattern generation unit 13 selects one test pattern from among specified test patterns, and generates, for example, the first test pattern Testpat [3:0]. The specified test pattern is stored in, for example, memory provided for the test pattern generation unit 13 in advance. The test pattern generation unit 13 outputs the first test pattern Testpat [3:0] to the transmission switch selection unit 12.

In addition, the test pattern generation unit 13 selects a test pattern from among specified test patterns after a lapse of specified time after the test pattern generation unit 13 outputs the first test pattern, and outputs it as the second test pattern. The specified time is, for example, the time in which next data can be received on the reception port 20.

In the first and second test patterns, each of the corresponding bits Testpat[0] through Testpat[3] can be different from one another. Therefore, the first and second test patterns are complementary data. Using the first and second test patterns, the reception port 20 can detect an error by one test pattern although the data is fixed to "0" or "1" due to an abnormal lane etc in the reception device 2.

The transmission switch control unit 11 outputs to the transmission switch selection unit 12 a control signal specifying whether a test pattern generated by the test pattern generation unit 13 is to be output or input data is to be output.

For example, the transmission switch control unit 11 outputs a control signal specifying which is to be transmitted, a test pattern Testpat [3:0] or transmission data SData [11:0]. For example, the control signal is output when the transmission switch control unit 11 receives a power-on signal or a reset signal PowOn/Rst by the power up operation etc. of the transmission/reception device. The control signal refers to the on (or high level) state of the test mode signal.

In this process, for example, in SData[11:0], the first number in the brackets indicates the highest order bit in the transmission data, and the last number in the brackets indicates the lowest order bit in the transmission data. Therefore, SData [11:0] indicates the transmission data including the 12 bits from the 0-th bit to the 11th bit. The number of bits of the transmission data is not limited to this application.

Furthermore, for example, in SData[0], the number in the brackets indicates the position of the bit in the transmission data or its value. Therefore, for example, SData[0] indicates the 0-th bit in the transmission data or its value.

The description above holds true with the received data SData[11:0] and the received data SData[0] described later.

For example, the transmission switch control unit 11 outputs to the transmission switch selection unit 12 and the transmission processing unit 15 the ON state of the test mode #A signal testmode#A during the specified error diagnostics. The ON state of the test mode #A signal is, for example, the control signal indicating the start of the test. Thus, during the ON state of the test mode #A signal, the test pattern Testpat [3:0] is selectively output from the transmission switch selection unit 12. That is, the test of the lane in the test mode #A is performed. The description holds true with other test modes.

In addition, the transmission switch control unit 11 outputs the ON state of the clear #A signal clr#A for initialization to the transmission error lane register 14 prior to, for example, the output of the ON state of the test mode #A signal. The ON state of the clear #A signal is, for example, the control signal indicating the start of the initialization, that is, the start of clear. The description holds true with other clear modes.

The transmission error lane register 14 receives error information err_set transmitted from an error detection unit 23 of the reception port 20 and holds the information. The transmission error lane register 14 designates the error lane in which an error has occurred according to the held error information, and holds the error lane information indicating the designated error lane.

On the other hand, when the transmission error lane register 14 receives the ON state of the clear #A signal output from the transmission switch control unit 11, it initializes the error lane information. The transmission error lane register 14 notifies the transmission data conversion unit 16 of the error lane information according to the held error lane information. The transmission error lane register 14 holds the error lane information until it receives the ON state of the clear #A signal.

The transmission processing unit 15 receives the input data transmitted from another computer, storage device, etc., and temporarily stores it. The input data is held in, for example, an internal buffer. The internal buffer is a storage device such as a register, memory, etc. provided in the transmission processing unit 15. The input data is sequentially stored in order from the head of the internal buffer in the order of reception in the transmission processing unit 15. The input data held in the internal buffer is to be transmitted to the reception device 2.

Upon receipt of the OFF state of the test mode #A signal from the transmission switch control unit 11, the input data is sequentially retrieved in the order in which the input data is stored, and output to the transmission data conversion unit 16 in the order of the retrieval. On the other hand, when the transmission processing unit 15 receives the ON state of the test mode #A signal from the transmission switch control unit 11, it holds the input data in the internal buffer, and the input data is not retrieved from the internal buffer. In this case, the input data is only accumulated in the internal buffer. The input data is held in the internal buffer until it is output to the transmission data conversion unit 16 from the OFF state of the test mode #A signal.

The transmission data conversion unit 16 converts the input data to the transmission data according to the error lane information indicating the error lane in which an error has occurred among a plurality of lanes. Practically, when no error lane exists, the transmission data conversion unit 16 sequentially allocates each bit of the input data to the plurality of lanes according to the error lane information, thereby determining the correspondence between the input data and the lane. The transmission data conversion unit 16 converts the input data to the transmission data according to the correspondence between the input data and the lane. When an error lane exists, the transmission data conversion unit 16 changes the correspondence between the input data and the lane into a new correspondence between the input data and lane to remove the error lane. The transmission data conversion unit 16 converts the input data to the transmission data according to the new correspondence between the input data and the lane, and outputs the transmission data to the transmission switch selection unit 12.

For example, when the transmission data conversion unit 16 receives the input data from the transmission processing unit 15, it converts the received input data into transmission data SData [11:0]. The transmission data conversion unit 16 outputs the transmission data SData [11:0] to the transmission switch selection unit 12. The details of the conversion into the transmission data by the transmission data conversion unit 16 are described later.

To perform the conversion, the transmission data conversion unit 16 determines whether or not there is an error lane according to the error lane information notified from the transmission error lane register 14. When an error lane exists, the transmission data conversion unit 16 allocates each bit of the input data to a lane other than the error lane, and converts the received input data into the transmission data based on the result of the allocation. On the other hand, when there is no error lane, the transmission data conversion unit 16 allocates each bit of the input data to all lanes, and converts the input data into the transmission data based on the result of the allocation.

The transmission switch selection unit 12 outputs a test pattern or input data according to the control signal from the transmission switch control unit 11. Therefore, the transmission switch selection unit 12 divides a plurality of lanes into a plurality of groups, determines the corresponding lanes in the plurality of groups, and allocates a bit at the same position of the test pattern to a corresponding lane, thereby determining the correspondence between the test pattern and the lane. The transmission switch selection unit 12 outputs the test pattern to a plurality of lanes according to the correspondence between the test pattern and the lanes.

For example, the transmission switch selection unit 12 selectively outputs to the system bus 3 one of the test pattern and the transmission data according to the control signal of the transmission switch control unit 11. That is, when the transmission switch selection unit 12 receives the ON state of the test mode #A signal from the transmission switch control unit 11, it outputs the test pattern output from the test pattern generation unit 13 to the system bus 3 as data. Upon receipt of the OFF state of the test mode #A signal (control signal for release of test), the transmission switch selection unit 12 outputs to the system bus 3 the transmission data output from the transmission data conversion unit 16 as data. That is, the transmission port 10 transmits the data to the reception port 20.

The reception port 20 receives the data transmitted from the transmission port 10. Therefore, the reception port 20 includes, as illustrated in FIG. 3, a reception switch control unit 21, a reception switch selection unit 22, an error detection unit 23, a reception error lane register 24, a reception processing unit 25, and a received data conversion unit 26.

The data received by the reception port 20, as described above, is transmission data or a test pattern. The transmission data is converted by the received data conversion unit 26, and output by the reception processing unit 25. The test pattern is transmitted to the error detection unit 23 for error detection.

The reception switch control unit 21 outputs to the reception switch selection unit 22 a control signal indicating which the data received through a plurality of lanes is to be, the test data for error diagnostics of a system bus or the data other than the test data.

For example, the reception switch control unit 21 outputs a control signal indicating which the data received by the reception switch selection unit 22 through the system bus 3 is to be, test data or received data. Practically, upon receipt of the output of the ON state of the power-on signal or the reset signal PowOn/Rst by the power up operation etc. of the transmission/reception device, the reception switch control unit 21 outputs the ON state of the test mode #B signal testmode#B to the reception switch selection unit 22 and the reception processing unit 25. Prior to the output, the reception switch control unit 21 outputs to the reception error lane register 24 the ON state of the clear #B signal clr#B.

Like the transmission switch selection unit 12, the reception switch selection unit 22 determines the correspondence between the test pattern and the lane. The correspondence between the test pattern and the lane determined by the reception switch selection unit 22 is the same as the correspondence between the test pattern and the lane determined by the transmission switch selection unit 12. The reception switch selection unit 22 receives the test pattern output to a plurality of lanes through the plurality of lanes according to the correspondence between the test pattern and the lane.

For example, the reception switch selection unit 22 receives data from the transmission port 10 through the system bus 3. The reception switch selection unit 22 selects test data TestData [11:0] or received data RData[11:0] as an output depending on the control signal of the reception switch control unit 21. Thus, the reception switch selection unit 22 outputs the data received through a plurality of lanes as test data or data other than the test data according to the control signal from the reception switch control unit 21.

For example, upon receipt of the ON state of the test mode #B signal from the reception switch control unit 21, the reception switch selection unit 22 outputs the data input from the system bus 3 as test data to the error detection unit 23. On the other hand, upon receipt of the OFF state of the test mode #B signal from the reception switch control unit 21, the reception switch selection unit 22 outputs the data input from the system bus 3 to the received data conversion unit 26.

The error detection unit 23 receives a test pattern from the reception switch selection unit 22, compares the bits in the same positions of the test patterns received through the corresponding lanes in a plurality of groups according to the correspondence between the test pattern and the lane, and generates error lane information indicating the error lane in which an error has occurred in the plurality of lanes based on the result of the comparison. The error detection unit 23 transmits the error lane information to the transmission error lane register 14 of the transmission device 1.

For example, upon receipt of the test data from the reception switch selection unit 22, the error detection unit 23 compares the bits of the correspondence described later in the test data TestData [11:0] based on the error detecting operation described later, and generates an error detection result. The error detection unit 23 outputs the error information err_set as a error detection result to the reception error lane register 24.

The reception error lane register 24 generates the error lane information as the information about the error lane of the system bus 3 according to the error information err_set output from the error detection unit 23, and holds the generated error lane information. On the other hand, upon receipt of the ON state of the clear #B signal output from the reception switch control unit 21, the reception error lane register 24 initializes the held error lane information. The reception error lane register 24 notifies the received data conversion unit 26 of the error lane information according to the held error lane information.

The received data conversion unit 26 converts the received data into the output data according to the error lane information generated by the error detection unit 23. Practically, when there is no error lane according to the error lane information, the received data conversion unit 26 sequentially allocates each bit of the output data to a plurality of lanes, thereby determining the correspondence between the output data and the lanes. The received data conversion unit 26 converts the received data into the output data based on the correspondence between the output data and the lanes. When there is an error lane, the received data conversion unit 26 changes the correspondence between the output data and the lanes into the new correspondence between the output data and the lanes so that the error lane can be removed. The received data conversion unit 26 converts the received data output from the reception switch selection unit 22 into the output data based on the new correspondence between the output data and the lanes.

For example, the received data conversion unit 26 converts the received data RData [11:0] input from the reception switch selection unit 22 into specified output data according to the error lane information in the reception error lane register 24. Practically, the received data conversion unit 26 determines whether or not there is an error lane according to the error lane information notified from the reception error lane register 24.

When there is an error lane, the received data conversion unit 26 converts the output data with the bits received only through the lanes other than the error lane defined as valid bit. When there is no error lane, the received data conversion unit 26 defines the bits received through all lanes as valid bits, and converts the output data. The received data conversion unit 26 outputs the thus converted output data to the reception processing unit 25. The contents of the conversion of the output data of the received data conversion unit 26 are described later in detail.

The reception processing unit 25 receives the data transmitted from the received data conversion unit 26 and temporarily holds the data. The data received from the received data conversion unit 26 is held in, for example, an internal buffer. The internal buffer is a storage device such as a register, memory, etc. provided for the reception processing unit 25. The data received from the received data conversion unit 26 is stored in the internal buffer sequentially from the heading position in the order in which the data has been received in the reception processing unit 25. The data held in the internal buffer is to be output to another computer, storage device, etc.

Upon receipt of the ON state of the test mode #B signal from the reception switch control unit 21, the reception processing unit 25 suspends the reception of data from the received data conversion unit 26, and does not hold data in the internal buffer. On the other hand, upon receipt of the OFF state of the test mode #B signal from the reception switch control unit 21, the reception processing unit 25 sequentially retrieves the held data from the internal buffer in the order in which the data has been stored, and outputs the data to another computer, storage device, etc. as the output data in the order in which the data has been retrieved. The data received from the received data conversion unit 26 is held in the internal buffer from the OFF state of the test mode #B signal to the output of the data to another computer, storage device, etc.

Figure 4:
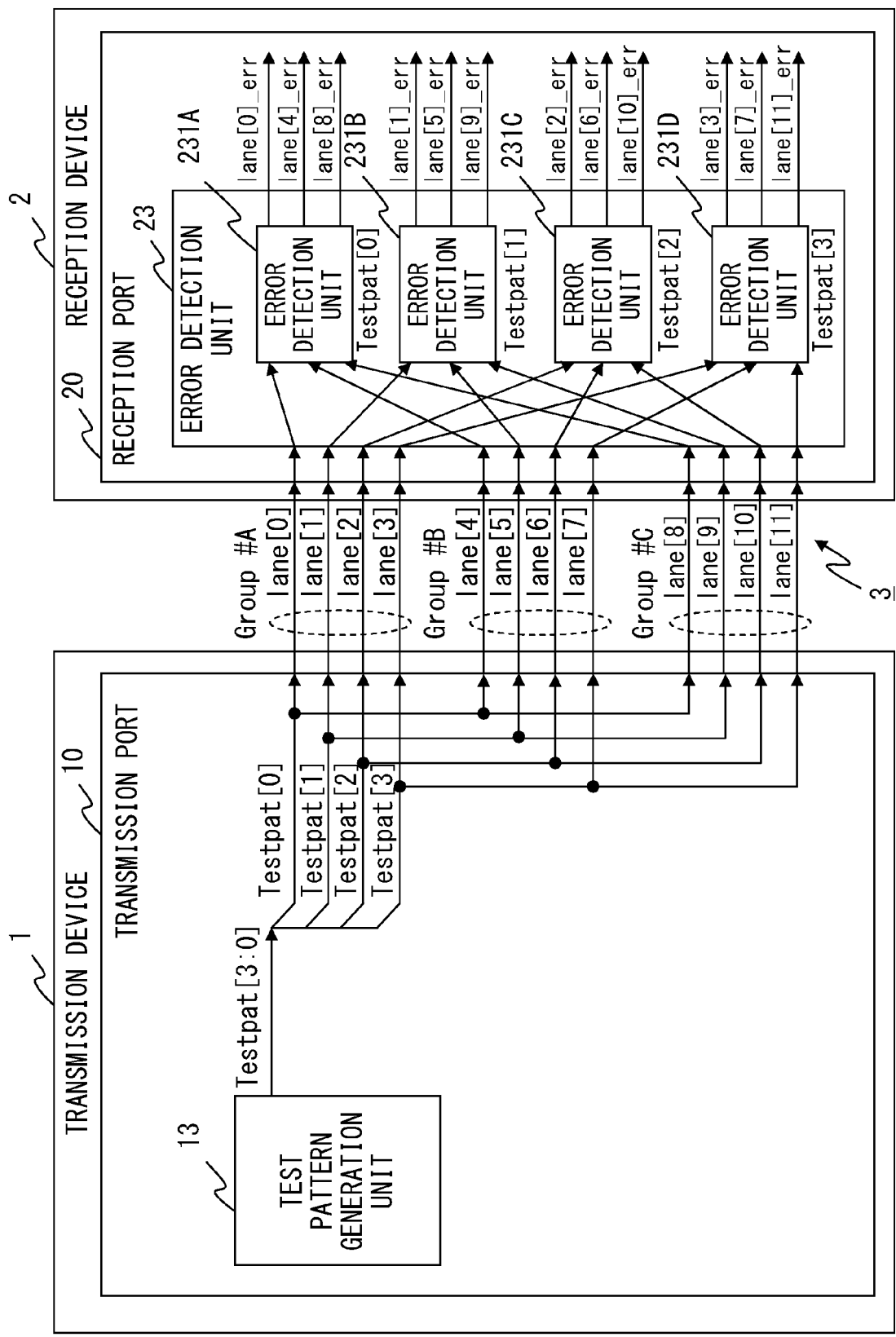
FIG. 4 is an explanatory view of detecting an error in the transmission/reception device.
Figure 5:
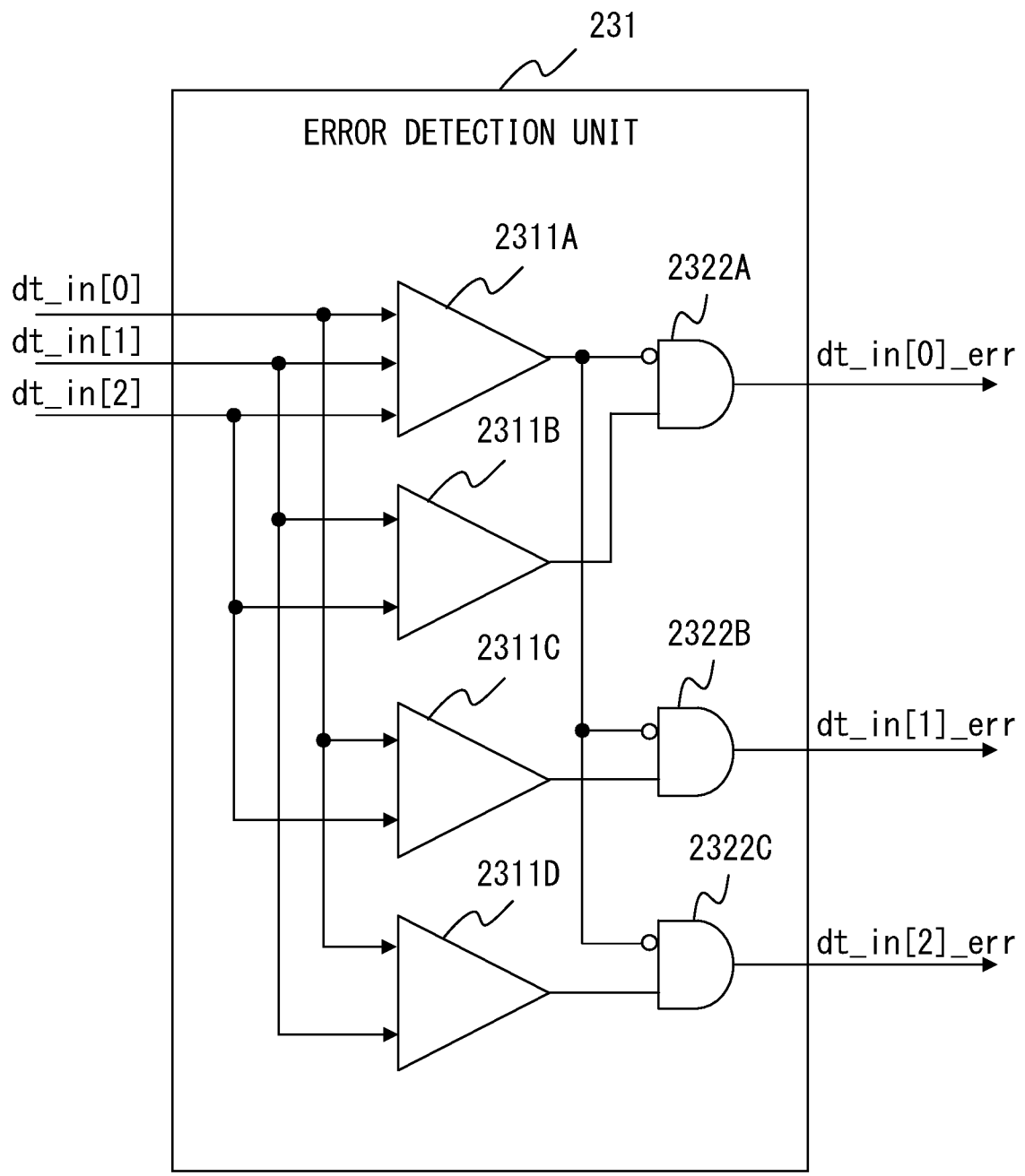
FIG. 5 is an example of a configuration of an error detection unit.

FIG. 4 is an explanatory view of detecting an error in the transmission/reception device illustrated in FIG. 1. FIG. 5 is an example of a configuration of the error detection unit provided for the transmission/reception device illustrated in FIG. 1. Described below are the operation of detecting an error in the system bus 3 of the transmission/reception device illustrated in FIG. 1 with reference to FIGS. 4 and 5.

The test pattern generation unit 13 generates a test pattern Testpat [3:0]. The test pattern Testpat [3:0] is a 4-bit pattern. That is, the test pattern generation unit 13 generates a test pattern by setting the values of "0" or "1" specified in the selected test pattern for each of the 4-bit Testpat[3] through [0] of the transmitted test pattern.

Practically, the test pattern generation unit 13 generates at least the first test pattern Testpat [3:0] and the second test pattern Testpat [3:0]. For example, when the first test pattern Testpat [3:0] is "1010", the second test pattern Testpat [3:0] is "0101". The test pattern generation unit 13 outputs the generated test pattern to the transmission switch selection unit 12.

The test pattern generation unit 13 can store the test pattern Testpat [3:0] in memory in advance.

The transmission switch selection unit 12 receives a test pattern output from the test pattern generation unit 13. Upon receipt of the ON state of the test mode #A signal from the transmission switch control unit 11, the transmission switch selection unit 12 allocates each bit of the received test pattern to the lane corresponding in a plurality of groups in the system bus 3. The transmission switch selection unit 12 outputs each bit of the test pattern to each lane of the system bus 3 depending on the allocation.

A plurality of groups are determined in advance. It is assumed that the number of lanes included in each group is constant. Then, the lanes included in each group correspond to the lanes of other groups.

In FIG. 4, since the received test pattern Testpat [3:0] is a 4-bit pattern and the number of the lanes [0] through [11] of the system bus 3 is 12, the number of groups is 3 (=12÷4). Therefore, in FIG. 4, each of the bits Testpat [3] through [0] of the received test pattern Testpat [3:0] are allocated to the corresponding lanes of three groups Group#A through #C. The transmission switch selection unit 12 outputs each bit of the received test pattern Testpat [3:0] to the lanes [0] through [11] in the system bus 3 depending on the allocation.

Practically, as illustrated in FIG. 4, the transmission switch selection unit 12 outputs the bits Testpat [0] through Testpat [3] of the test pattern Testpat [3:0] respectively to the lanes [0] through [3] of the group Group#A with a specified timing. The transmission switch selection unit 12 also outputs the bits Testpat[0] through Testpat[3] respectively to the lanes [4] through [7] of the group Group#B with a specified timing. A similar operation is performed on the lanes [8] through [11] of the group Group#C.

The specified timing refers to the same timing for the lanes [0] through [11] of the system bus 3 for the transmission switch selection unit 12. Thus, the data to be transmitted is transmitted to the plurality of lanes [0] through [11] of the system bus 3 with the same timing.

Thus, the data output to the lanes [0], [4], and [8] refers to the bit Testpat[0] in the same position of the same test pattern Testpat [3:0]. Similarly, the data output to other lanes is one of the bits Testpat[1] through [3] in the same position for the lane corresponding in a plurality of groups as illustrated in FIG. 4.

Thus, it is assumed that the data obtained by outputting the test pattern Testpat [3:0] to the lanes [0] through [11] is referred to as the test data TestData [11:0], that is, the bit TestData[0] through [11]. That is, the transmission switch selection unit 12 generates a 12-bit test data TestData [11:0] based on the 4-bit test pattern Testpat [3:0] as described above, and outputs the generated test data TestData [11:0] to the system bus 3.

As a result, when there is no error in a lane in the data received by the reception port 20, the data of the corresponding lane in a plurality of groups is the same data. Using the identity of the data, the reception port 20 can perform error diagnostics without an expected value of a test pattern.

As described above, the transmission device 1 transmits (outputs) the above-mentioned data from the transmission port 10 through the system bus 3. The reception device 2 receives (inputs) the data transmitted by the reception port 20 from the transmission port 10 through the system bus 3. That is, the reception switch selection unit 22 of the reception port 20 receives the data transmitted from the transmission port 10 as data through the lanes [0] through [11] of the system bus 3.

Upon receipt of the ON state of the test mode #B signal from the reception switch control unit 21, the reception switch selection unit 22 outputs the data received through the reception port 20 to the error detection unit 23 as test data TestData [11:0]. The data of the bit TestData[0] of the test data TestData [11:0] is the data received from the lane [0]. Similarly, the data of the bit TestData[1] through [11] of the test data is the data received from the lanes [1] through [11].

The error detection unit 23 allocates the test data TestData [11:0] received from the reception switch selection unit 22 to the error detection units 231A through 231D respectively corresponding to the bits Testpat[0] through [3] of the test pattern Testpat [3:0]. The error detection units 231A through 231D respectively correspond to the bits Testpat[0] through [3] of the test pattern Testpat [3:0].

For example, the error detection unit 23 transmits to the error detection unit 231A the data of the bits TestData [0], TestData [4], and TestData [8] from the test data TestData [11:0]. The error detection unit 23 transmits to the error detection unit 231B the data of the bits TestData[1], TestData [5], and TestData[9]. The description holds true with the error detection unit 231C and the error detection unit 231D.

An error detection unit 231 is a logical circuit for checking the matching state of the input dt_in[0] through [2]. As illustrated in FIG. 5, the error detection unit 231 generates the error information about the output dt_in[0]_err, the output dt_in[1]_err, and the output dt_in[2]_err based on the logical circuit for detecting an error using the data (input dt_in[0] through [2]) allocated by the error detection unit 23 as input. To attain this, the error detection unit 231 is provided with a plurality of comparators 2311 AND circuits 2322.

The error detection unit 231 represents error detection units 231A through 231D, a comparator 2311 represents comparators 2311A through 2311D, and an AND circuit 2322 represents AND circuits 2322A through 2322C.

An example of the logical circuit for detecting an error is described below mainly with reference to FIG. 5.

The comparator 2311A outputs "1" when all logics of three inputs match, and "0" otherwise to each of the AND circuits 2322A through 2322C. The comparator 2311B performs the operation for matching between input dt_in[1] and input dt_in[2]. When a matching result is obtained, it outputs "1" to the AND circuits 2322A. When a non-matching result is obtained, it outputs "0" to the AND circuits 2322A.

The AND circuits 2322A obtains an AND logic between the logic obtained by inverting the output of the comparator 2311A and the output of the comparator 2311B, and outputs the result as an output dt_in[0]_err. Similarly, the AND circuit 2322B outputs an output dt_in[1]_err. The AND circuit 2322C outputs an output dt_in[2]_err.

As described above, for example, when the input dt_in[0] indicates "0" and the input dt_in[1] and the input dt_in[2] indicates "1", the error detection unit 231 generates an output dt_in[0]_err="1", an output dt_in[1]_err="0", and output dt_in [2]_err="0". The error detection unit 231 outputs the generated output dt_in[0]_err through output dt_in[2]_err to the reception error lane register 24. Thus, the reception error lane register 24 can determine that the input dt_in[0] does not match other inputs. In this case, the reception error lane register 24 determines that an error has occurred on the non-matching input based on majority rule. That is, upon receipt of the output from the error detection unit 231, the reception error lane register 24 determines that an error has occurred in the lane corresponding to the input dt_in[0] according to the above-mentioned determination.

In FIG. 4, the error detection unit 231A allocates the input (dt_in[0] through [2]) corresponding to the bit Testpat[0] to the test pattern Testpat [3:0] output from the test pattern generation unit 13 as follows.

For example, the error detection unit 231A inputs to the input dt_in[0] through [2] the data of the bits TestData[0], TestData[4], and TestData[8] of the test data TestData [11:0]. For example, when the input of the bit TestData[0] is "0" and the inputs of the bits TestData[4] and the TestData[8] are "1", the error detection unit 231A generates and outputs the output lane[0]_err="1", lane[1]_err="0", and lane[2]_err="0". The reception error lane register 24 can determine that an error has occurred in the lane [0] based on the result output by the error detection unit 231A.

The above-mentioned process is similarly performed by the error detection units 231B through 231D for a logical operation by comparison of bits Testpat[1] through [3] of the test pattern Testpat [3:0].

As described above, the reception error lane register 24 receives error information err_set about the output lane[0] _err through lane[11]_err from the error detection unit 23, and holds the received error information. Thus, the reception error lane register 24 can designate an error lane based on the error information.

On the other hand, upon receipt of the ON state of the clear #B signal from the reception switch control unit 21, the reception error lane register 24 initializes the held error information. That is, after the initialization, the reception error lane register 24 holds the error lane information indicating that there is no error lane. Therefore, after the initialization of the reception error lane register 24, the reception error lane register 24 receives a result of the error diagnostics from the error detection unit 231, generates error lane information, and newly holds the error information.

Thus, the lanes of the system bus 3 are divided into a plurality of groups, and the test pattern signal output to the corresponding lane in the plurality of groups is shared. Thus, the data received through the corresponding lane in the plurality of groups can be compared. As a result, by comparing the data of the corresponding lane in the plurality of groups, an error can be detected in the system bus 3. Therefore, it is not necessary for the reception device to have an expected value of a test pattern in advance. In addition, the comparison circuit of received data can be easily realized and shared. As a result, an error can be detected by a simple circuit, and error diagnostics can be performed in a short time.

As described above, the error detection unit 23 outputs the output lane[0]_err through lane[11]_err generated by each error detection unit 231 as error information err_set to the transmission error lane register 14 and the reception error lane register 24. Furthermore, according to the transmission/reception device illustrated in FIGS. 1 through 3, the transmission port 10 and the reception port 20 can continue the data transmission excluding the error lane as described later according to the error information.

Figure 6:
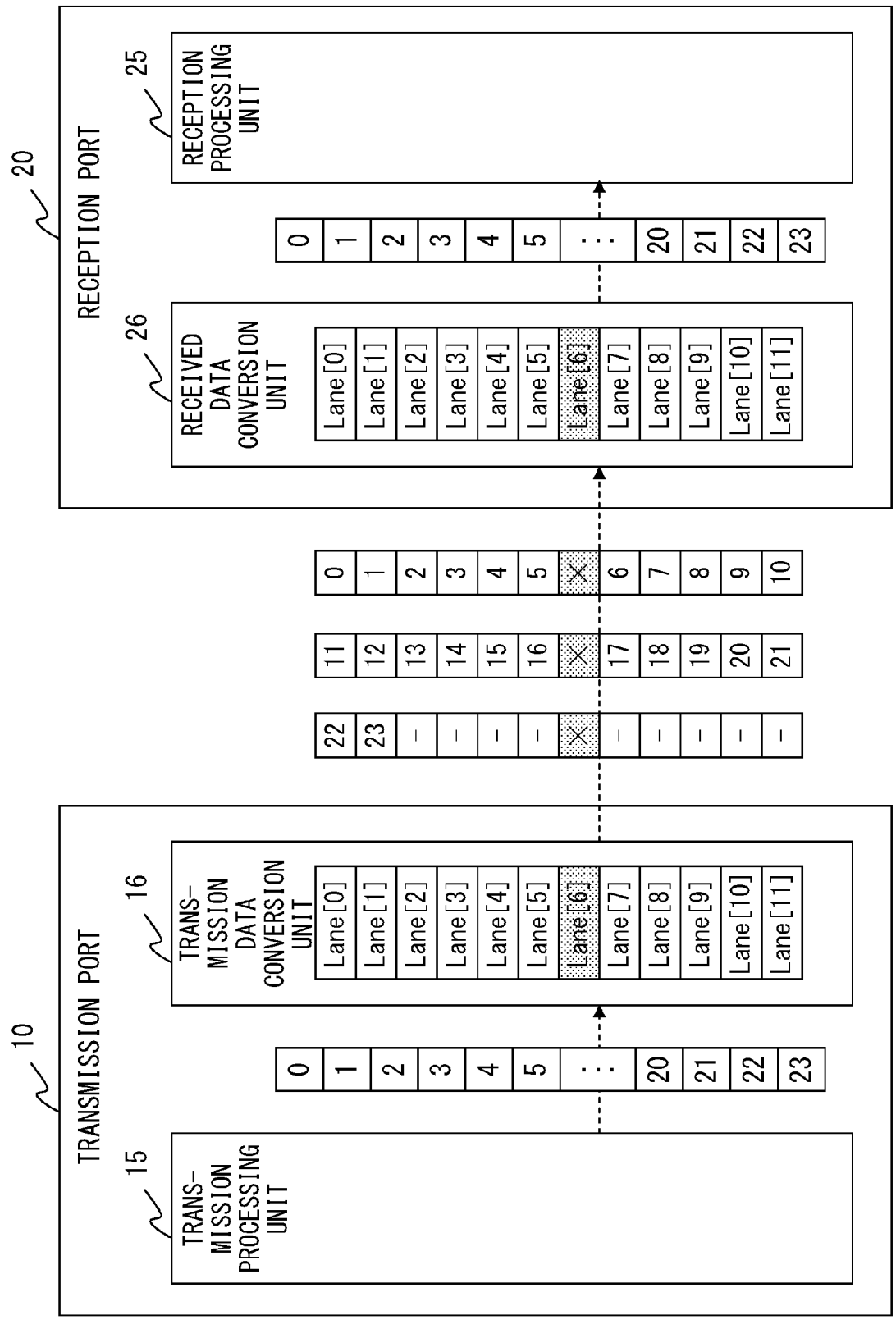
FIG. 6 is an explanatory view of transmitting and receiving data when an error is detected.

Described below are the contents of continuing the data transmission excluding an error lane by the transmission port 10 and the reception port 20. FIG. 6 is an explanatory view of transmitting and receiving data when an error is detected, and of the transmission and reception of data when an error is detected in the transmission/reception device illustrated in FIG. 4.

The error detection unit 23 outputs the error information err_set to the transmission error lane register 14 and the reception error lane register 24. For example, in the period of the ON state of the test mode #A signal of the transmission port 10 and the ON state of the test mode #B signal of the reception port 20 illustrated in FIG. 4, the error detection unit 23 outputs the error information about the lanes [0] through [11]. Upon receipt of the information, the transmission error lane register 14 generates the error lane information having the lane [6] as an error lane according to the error information from the error detection unit 23, and holds the generated error lane information. The transmission error lane register 14 notifies the transmission data conversion unit 16 of the error lane information.

The transmission data conversion unit 16 inputs the input data from the transmission processing unit 15. The input data is 24-bit data including the bits 0 through 23. When there is an error lane in the lanes [0] through [11] according to the error lane information, the transmission data conversion unit 16 removes the allocation of a corresponding bit of the input data with respect to the bit corresponding to the error lane in the transmission data SData [11:0]. That is, the transmission data conversion unit 16 allocates the bits 0 through 23 of the input data to the 24 bits of the bits 0 through 23 of the input data transmitted from the transmission processing unit 15 excluding the bit SData[6] of the transmission data corresponding to the lane [6] of the error lane according to the error lane information. The transmission data conversion unit 16 converts the input data into the transmission data SData [11:0] based on the allocation, and transmits the data to the transmission switch selection unit 12.

Practically, the transmission data conversion unit 16 allocates the data of bits 0 through 5 of the input data to the bits SData[0] through SDada[5] of the transmission data SData [11:0], and allocates bits 6 through 10 of the input data to the bits SData[7] through SDada[11] of the transmission data SData [11:0]. That is, the transmission data conversion unit 16 does not allocate a bit of the input data only to the bit SData[6] of the transmission data SData [11:0]. Similarly, the transmission data conversion unit 16 allocates bits 11 through 23 of the input data. The transmission data conversion unit 16 transmits the transmission data SData [11:0] to the transmission switch selection unit 12 in three separate transmitting operations based on the bit allocation above. Thus, the transmission port 10 can transmit data through a lane other than the lane [6] specified as an error lane of the system bus 3.

The reception port 20 receives the data through the system bus 3 from the transmission port 10. In the reception port 20, the reception switch selection unit 22 receives the data transmitted through the system bus 3. The reception switch selection unit 22 outputs the received data as the received data RData [11:0] to the received data conversion unit 26 as described above.

The reception error lane register 24 receives the error information about the lane [6] from the error detection unit 23, and generates and holds error lane information according to the received error information. The reception error lane register 24 notifies the received data conversion unit 26 of the error lane information.

The received data conversion unit 26 determines that the lane [6] is an error lane according to the error lane information in the reception error lane register 24, and does not adopt the bit RData [6] in the received data RData [11:0] corresponding to the lane [6]. That is, the received data conversion unit 26 discards the data of the bit RData [6] in the received data RData [11:0], receives the data RData [11:0] received in three receiving operations, and then converts the data into output data, that is, 24-bit data.

Practically, the received data conversion unit 26 allocates the data of bits 0 through 5 of the output data to the bits RData [0] through RDada [5] of the received data RData [11:0], and allocates bits 6 through 10 of the output data to the bits RData [7] through RDada [11] of the received data RData [11:0]. That is, the received data conversion unit 26 does not allocate a bit of the output data to the bit RData [6] of the received data RData [11:0]. Similarly, the received data conversion unit 26 allocates bits 11 through 23 of the output data.

Therefore, in this case, as illustrated in FIG. 6, the received data conversion unit 26 generates output data, that is, 24-bit data by receiving data in three receiving operations. The received data conversion unit 26 outputs the generated output data to the reception processing unit 25. The reception processing unit 25 inputs the output data from the received data conversion unit 26, and holds in an internal buffer the output data that has been input.

As described above, the disclosed transmission/reception device can determine whether or not an error lane has been detected in a plurality of lanes of the system bus 3, and generate error lane information. Thus, the transmission port 10 excludes the error lane according to the error lane information, allocates each bit of the input data to a normal lane, and transmits data through the system bus 3. The reception port 20 receives data, and converts data into output data according to the error lane information. That is, when there is an error lane, the reception port 20 defines the data received through the lanes other than the error lane as valid data in the data, and converts the received valid data into output data.

Therefore, although an error has occurred in a lane, the transmission/reception device can continue the data transmission.

Thus, according to the disclosed transmission/reception device, lane diagnostics are performed by comparing the bits in the same position in each group. Thus, error diagnostics can be performed on the lanes without setting an expected value corresponding to a test pattern in an error detection unit of the reception side. In addition, an error detection unit does not require an expected value corresponding to a test pattern, and diagnostics on a plurality of lanes are performed in the corresponding lanes in a plurality of groups of the lanes using common test pattern and error detection unit, thereby realizing a simple error diagnostic circuit. Furthermore, all lane simultaneous diagnostics can be performed, an error portion can be designated, and the diagnostic time can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A transmission and reception device comprising:
a transmission device configured to transmit data;
a reception device configured to receive the data; and
a system bus including a plurality of connection lines connecting the transmission device to the reception device, wherein
the transmission device includes:
a test pattern generation unit that generates a test pattern including a plurality of bits; and
a transmission switching selection unit that divides the plurality of connection lines into a plurality of groups, and determines corresponding connection lines among the plurality of groups, and that allocates a plurality of bits included in the test pattern to the corresponding connection lines among the plurality of groups, and outputs the test pattern to the plurality of connection lines based on the correspondence between the test pattern and the connection line; and
the reception device includes:
a reception switching selection unit that receives a plurality of test patterns each of which is transmitted through one of the plurality of connection lines based on the correspondence between the test pattern and the connection line; and
an error detection unit that receives the plurality of the test patterns from the reception switching selection unit, and compares each received test patterns with one another to determine whether or not each bits included in the received test patterns match each other, and that generates erroneous connection line information indicating an erroneous connection line as a connection line in which an error has occurred in the plurality of connection lines based on a result of the comparison.

2. The device according to claim 1, further comprising
a transmission switch control unit that is provided in the transmission device, and outputs to the transmission switching selection unit a control signal indicating whether a test pattern generated by the test pattern generation unit is to be output or input data is to be output, wherein
the transmission switching selection unit outputs the test pattern or the input data according to the control signal from the transmission switch control unit.

3. The device according to claim 1, further comprising:
a transmission processing unit that is provided in the transmission device and outputs the input data to a transmission data conversion unit; and
a transmission data conversion unit that is provided in the transmission device, and converts the input data into the transmission data according to erroneous connection line information indicating an erroneous connection line as a connection line in which an error has occurred in the plurality of connection lines received from the reception device, wherein
when there is no erroneous connection line according to the erroneous connection line information, the transmission data conversion unit determines a correspondence between the input data and the connection line by sequentially allocating each bit of the input data to the plurality of connection lines, converts the input data into the transmission data according to the correspondence between the input data and the connection line, and the transmission data conversion unit changes the correspondence between the input data and the connection line into a new correspondence between input data and connection line so that the erroneous connection line can be removed when there is an erroneous connection line, converts the input data into the transmission data based on the new correspondence between the input data and lane, and outputs the transmission data to the transmission switching selection unit.

4. The device according to claim 3, wherein
the error detection unit transmits the erroneous connection line information to the transmission device.

5. The device according to claim 1, further comprising:
a reception switch control unit that is provided in the reception device, and outputs to the reception switching selection unit a control signal indicating the data received through the plurality of connection lines is to be test data for error diagnostics of the system bus, or data other than the test data, wherein
the reception switching selection unit outputs the data received through the plurality of connection lines according to the control signal from the reception switch control unit as the test data or data other than the test data.

6. The device according to claim 1, further comprising:
a received data conversion unit that is provided in the reception device, and converts the reception data into the output data according to the erroneous connection line information generated by the error detection unit; and
a reception processing unit that outputs the output data, wherein
when there is no erroneous connection line according to the erroneous connection line information, the received data conversion unit determines a correspondence between the output data and the connection line by sequentially allocating each bit of the output data to the plurality of connection lines, and converts the received data into the output data based on the correspondence between the output data and the connection line, and the received data conversion unit changes the correspondence between the output data and the connection line into a new correspondence between the output data and the connection line so that the erroneous connection line can be removed when there is an erroneous connection line, and converts the received data output by the reception switching selection unit into the output data based on the new correspondence between the output data and the connection line.

7. The device according to claim 1, wherein
the test pattern generation unit generates and outputs a second test pattern as complementary data for a first test pattern after a lapse of specified time after the test pattern generation unit generated and output the first test pattern.

8. A reception device coupled to a transmission device for transmitting data through a system bus including a plurality of connection lines, and receives the data, the reception device comprising:
 a reception switching selection unit that divides the plurality of connection lines into a plurality of groups, and determines corresponding connection lines among the plurality of groups, and that allocates a plurality of bits included in the test pattern to the corresponding connection lines among the plurality of groups, and receives a plurality of test patterns each of which is transmitted through one of the plurality of connection lines based on the correspondence between the test pattern and the connection line; and
 an error detection unit that receives the plurality of the test patterns from the reception switching selection unit, and compares each received test patterns with one another to determine whether or not each bits included in the received test patterns match each other, and that generates erroneous connection line information indicating an erroneous connection line as a connection line in which an error has occurred in the plurality of connection lines based on a result of the comparison.

9. A data transmission and reception method comprising:
 generating a test pattern including a plurality of bits;
 dividing the plurality of connection lines into a plurality of groups;
 determining corresponding connection lines among the plurality of groups;
 allocating a plurality of bits included in the test pattern to the corresponding connection lines among the plurality of groups;
 outputting the test pattern to the plurality of connection lines based on the correspondence between the test pattern and the connection line;
 receiving a plurality of test patterns each of which is transmitted through one of the plurality of connection lines based on the correspondence between the test pattern and the connection line;
 comparing each received test patterns with one another to determine whether or not each bits included in the received test patterns match each other; and
 generating erroneous connection line information indicating an erroneous connection line as a connection line in which an error has occurred in the plurality of connection lines based on a result of the comparison.

10. The device according to claim 9, wherein
the outputting generates and outputs a second test pattern as complementary data for a first test pattern after a lapse of specified time after the first test pattern is generated and output.

* * * * *